(12) United States Patent
Yin (10) Patent No.: US 6,695,475 B2
(45) Date of Patent: Feb. 24, 2004

(54) TEMPERATURE SENSING CIRCUIT AND METHOD

(75) Inventor: Rong Yin, Coppell, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/872,695

(22) Filed: May 31, 2001

(65) Prior Publication Data

US 2002/0181543 A1 Dec. 5, 2002

(51) Int. Cl.$^7$ ............................. G01K 7/24; G01K 15/00
(52) U.S. Cl. ........................... 374/171; 374/1; 327/512; 702/99; 702/130; 377/25; 377/49; 331/57; 331/66
(58) Field of Search .................. 374/170, 171, 374/1, 117; 327/512; 702/99, 130; 377/25, 49; 331/66, 57

(56) References Cited

U.S. PATENT DOCUMENTS

| | | | |
|---|---|---|---|
| 4,079,338 A | * | 3/1978 | Kronlage .................... 374/170 |
| 4,150,573 A | * | 4/1979 | Iinuma et al. ............... 374/170 |
| 4,172,384 A | * | 10/1979 | Tamura et al. .............. 374/170 |
| 4,370,070 A | * | 1/1983 | Leroux ...................... 374/170 |
| 4,371,271 A | * | 2/1983 | Bellet ....................... 374/183 |
| 4,602,871 A | * | 7/1986 | Hanaoka .................... 374/170 |
| 4,644,481 A | * | 2/1987 | Wada ........................ 702/131 |
| 4,658,407 A | * | 4/1987 | Iwama ...................... 374/170 |
| 5,388,134 A | * | 2/1995 | Douglass et al. ........... 374/170 |
| 5,899,570 A | * | 5/1999 | Darmawaskita et al. .... 374/170 |

FOREIGN PATENT DOCUMENTS

| | | |
|---|---|---|
| DE | 28 22 509 A | 11/1978 |
| EP | 0 149 215 A | 7/1985 |
| GB | 2 118 307 A | 10/1983 |

OTHER PUBLICATIONS

Patent Abstracts of Japan vol. 008, No. 038, Nov. 7, 1983, JP 58 190735 A, abstract.
Patent Abstracts of Japan vol. 008, No. 214, Jun. 4, 1984, JP 59 097026 A, abstract.
Patent Abstracts of Japan vol. 009, No. 101, Dec. 18, 1984, JP 59 225324 A, abstract.
EPO European Search Report for EP 02 25 3636, Aug. 27, 2002.

* cited by examiner

*Primary Examiner*—Diego Gutierrez
*Assistant Examiner*—Stanley J. Pruchnic, Jr.
(74) *Attorney, Agent, or Firm*—Lisa K. Jorgenson; Andre Szuwalski (57) ABSTRACT

A method and circuit are disclosed for measuring temperature. An exemplary embodiment of the present invention includes a first oscillator circuit that generates a first signal having a frequency that is dependent upon a sensed temperature. Difference circuitry determines a difference in frequency between the first signal and the second signal having a frequency that is substantially independent of temperature, and generates a difference signal having a number of pulses thereon based upon the difference. A counter circuit is responsive to the difference circuitry for offsetting a predetermined temperature level based upon the pulses appearing on the difference signal, to obtain an output signal indicative of the sensed temperature.

38 Claims, 4 Drawing Sheets

TEMPERATURE SENSING CIRCUIT AND METHOD

BACKGROUND OF THE INVENTION

1. Technical Field of the Invention

The present invention relates to sensing a temperature, and particularly to a circuit and method for temperature sensing, with self-calibration.

2. Description of the Related Art

On-chip temperature sensors have been used in a variety of applications to measure temperature. A typical on-chip temperature sensor utilizes a proportional-to-absolute-temperature (PTAT) resistive element having a resistance that is based upon its temperature, and a ring oscillator which oscillates at a frequency that is dependent upon the resistance of the PTAT resistive element. The temperature is determined by measuring the frequency of the ring oscillator and determining the temperature sensed by the PTAT resistive element based upon the measured frequency.

One shortcoming with conventional temperature sensors is that devices and/or circuitry for measuring the frequency of the ring oscillator and determining the temperature therefrom are oftentimes complex and occupy an excessive amount of silicon space. Another shortcoming associated with conventional temperature sensors utilizing PTAT resistive elements is that the resistance thereof may vary considerably due to process variations. This can be seen to adversely affect the ability to accurately measure temperature. What is needed, then, is a temperature sensing device that can accurately and efficiently measure temperature.

SUMMARY OF THE INVENTION

Embodiments of the present invention overcome shortcomings in prior temperature sensing circuitry and satisfy a significant need for an on-chip temperature sensing device that efficiently and accurately measures temperature. In a first embodiment of the present invention, the temperature sensing device includes an oscillator circuit that generates a first signal having a frequency which is dependent upon a sensed temperature. A difference circuit receives the first signal and a reference signal having a known, temperature-insensitive frequency and generates a difference signal having a number of pulses thereon corresponding to a difference in frequency between the first signal and the reference signal. One or more counter circuits receives the difference signal and offsets a predetermined temperature value corresponding to the frequency of the reference signal, to obtain an output signal indicative of the sensed temperature.

In a second embodiment of the present invention, the oscillator circuit includes a PTAT resistive element having a resistance based upon a sensed temperature. The frequency of the first signal is then based upon the resistance of the PTAT resistive element. In order to more accurately measure temperature, the temperature sensing device includes self-calibration circuitry for comparing the frequency of the first signal with the known, temperature-insensitive frequency of the reference signal and generating one or more calibration output signals having a value indicative of an amount by which the PTAT resistive element needs to be increased or decreased. For example, the one or more calibration output signals may indicate any one of several values by which the PTAT resistive element is to be increased or decreased. Based upon the value of the calibration output signal, the PTAT resistive element may be trimmed or otherwise modified accordingly.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which preferred embodiments of the invention are shown. This invention may, however, be embodied in many different forms and should not be construed as being limited to the embodiments set forth herein. Rather, the embodiments are provided so that this disclosure will be thorough and complete, and will fully convey the scope of the invention to those skilled in the art.

Referring to FIGS. 1–6, there is shown an on-chip temperature sensing device 1 according to exemplary embodiments of the present invention. Temperature sensing device 1 senses a temperature and generates a signal indicative of the sensed temperature. Temperature sensing device 1 may be implemented as part of an integrated circuit chip performing other functions in addition to temperature sensing. Alternatively, temperature sensing device 1 may be implemented as a stand-alone integrated circuit.

Figure 1:
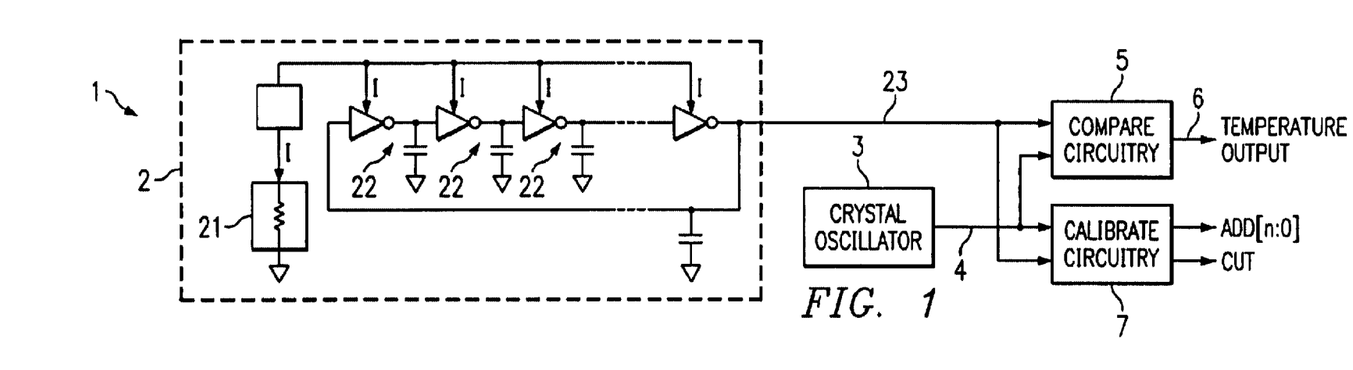
FIG. 1 is a block diagram of a temperature sensing device according to an embodiment of the present invention.
Figure 2:
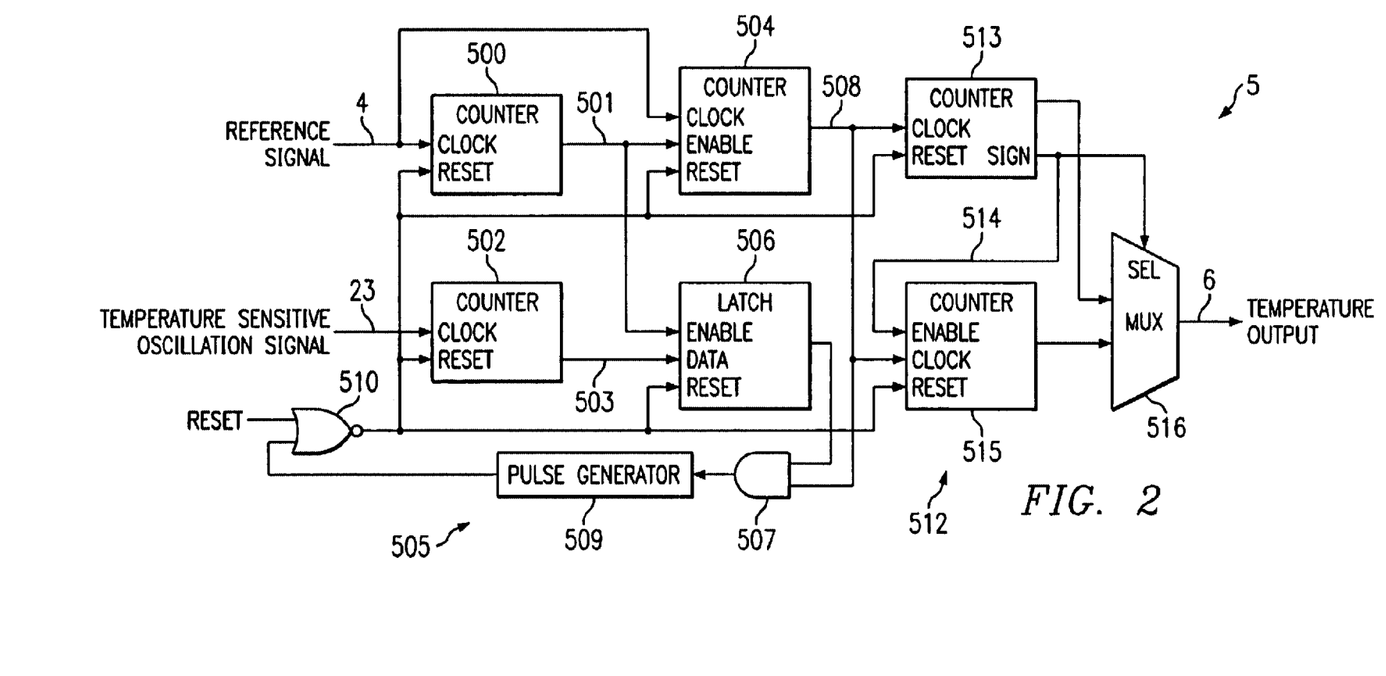
FIG. 2 is a diagram of a circuit of the temperature sensing device of FIG. 1.

Temperature sensing device 1 may include a temperature sensitive ring oscillator 2 that senses a temperature and generates an output signal having a frequency based upon the sensed temperature. Temperature sensitive oscillator 2 may include a proportional-to-absolute-temperature (PTAT) resistive element 21 whose resistance changes based upon the temperature, and a ring of logic inverters 22, one or more of which operates at a current level I dependent upon the resistance of the PTAT resistive element 21. The ring of logic inverters 22 is seen to oscillate at a frequency based upon the current level I and therefore the resistance of the PTAT resistive element 21. Temperature sensitive oscillation signal 23 may be an output taken from any logic inverter 22 in the ring of logic inverters.

It is understood that temperature sensitive oscillator 2 may include temperature sensitive component (s) other than PTAT resistive element 21 for sensing the temperature. It is further understood that temperature sensitive oscillator 2 may include circuitry other than the ring of logic inverters 22 for generating temperature sensitive oscillation signal 23 having a frequency that is dependent upon the resistance of PTAT resistive element 21.

Temperature sensing device 1 may further include a temperature insensitive oscillator 3 that generates a reference signal 4 having a known, temperature insensitive frequency. For example, temperature insensitive oscillator 3 may include a crystal or other temperature insensitive component (s) for use in generating reference signal 4. In an alternative embodiment, reference signal 4 is generated externally to temperature sensing device 1 and/or the integrated circuit chip in which temperature sensing device 1 is disposed. The frequency of reference signal 4 is selected to correspond to the frequency at which temperature sensitive oscillator 2 is expected to oscillate at a predetermined temperature. In the exemplary embodiment of the present invention, the frequency of reference signal 4 is selected to be the frequency of temperature sensitive oscillator 2 at −63 degrees C. It is understood, however, that frequencies corresponding to other temperatures may be selected.

In accordance with an exemplary embodiment of the present invention, temperature sensing device 1 includes compare circuitry 5 that generally compares the frequency of the temperature sensitive oscillation signal 23 with the frequency of reference signal 4, and generates an output signal 6 indicative of the temperature sensed by temperature sensitive oscillator 2.

Referring to FIG. 2, there is shown an exemplary implementation of compare circuitry 5. Compare circuitry 5 includes a first counter 500 for receiving reference signal 4 and counting a first predetermined number of pulses appearing on reference signal 4. First counter 500 is adapted to be disabled so as to discontinue counting pulses when a first predetermined number of consecutive pulses have been counted. When a first predetermined number of consecutive pulses are counted on reference signal 4, first counter 500 asserts signal 501. First counter 500 may be reset by a reset signal.

Compare circuitry 5 includes a second counter 502 for receiving temperature sensitive oscillation signal 23 and counting a second predetermined number of consecutive pulses appearing thereon. Second counter 502 is adapted to be disabled so as to discontinue counting pulses when a second predetermined number of consecutive pulses have been counted. When a second predetermined number of consecutive pulses are counted on temperature sensitive oscillation signal 23, second counter 502 asserts signal 503. Second counter 502 may be reset by a reset signal.

It is noted that the first predetermined number may be equal to the second predetermined number, but alternatively the first and second predetermined numbers are not be the same.

Compare circuitry 5 may further include a third counter 504 for receiving reference signal 4 and counting a third predetermined number of pulses appearing thereon. Third counter 504 is enabled to count the pulses appearing on reference signal 4 based upon the assertion of signal 501 generated by first counter 500. In this way, third counter 504 only begins to count pulses appearing on reference signal 4 following a first predetermined number of pulses appearing on reference signal 4 (and counted by first counter 500). When enabled, third counter 504 is adapted to continuously cycle through the counter states thereof. In other words, when third counter 504 has counted through each of its counter states, third counter 504 is adapted to restart or continue counting by returning to the first counter state upon the occurrence of a pulse appearing on reference signal 4. Third counter 504 asserts signal 508 each time third counter 504 has cycled through each counter state thereof.

First counter 500 thus counts a first predetermined number of pulses appearing on reference signal 4 and third counter 504 counts pulses on reference signal 4 thereafter.

First counter 500, second counter 502 and third counter 504 are adapted to determine a difference between and/or compare the frequency of temperature sensitive oscillation signal 23 and the frequency of reference signal 4, and generate a signal 508 indicative of the comparison. The frequency comparison operation is such that the number of pulses appearing on signal 508 during a frequency compare operation indicates the difference in frequency between temperature sensitive oscillation signal 23 and reference signal 4. Because the frequency of reference signal 4 is known and selected to correspond to the operating frequency of temperature sensitive oscillator 2 at a predetermined temperature, the frequency difference indicates the temperature sensed by temperature sensitive oscillator 2. The frequency comparison operation will be described in greater detail below.

Temperature sensing device 1 further includes reset circuitry 505 for resetting the counter 500, 502 and 504 approximately upon second counter 502 counting a second predetermined number of pulses on temperature sensitive oscillation signal 23. In particular, reset circuitry 505 may include a latch or other storage element 506 coupled to receive signals 501 and 503. Signal 501 drives an enable and/or latch input of storage element 506 and signal 503 drives the data input thereof. A logic gate 507, such as an AND gate, receives the output of storage element 506 and signal 508 generated by third counter 504. A pulse generator circuit 509 receives the output of logic gate 507 and is adapted to generate a pulse following an edge transition, such as a rising edge transition, appearing on the input of pulse generator circuit 509. In this way, shortly after the time first counter 501 and second counter 502 have each counted their respective predetermined number of pulses on reference signal 4 and temperature sensitive oscillation signal 23, respectively, a pulse is generated to reset the counters and begin a new frequency comparison operation. A second logic gate 510 may be included to provide for a reset operation initiated externally to temperature sensing device 1.

As stated above, the number of pulses appearing on signal 508 during a frequency comparison operation indicates a difference in frequency between temperature sensitive oscillation signal 23 and reference signal 4, and hence an indication of the temperature sensed by temperature sensitive oscillator 2. In order to convert the pulses on signal 508 into a value indicative of temperature, temperature sensing device 1 includes conversion circuitry 512. Conversion circuitry 512 generally counts the pulses appearing on signal 508 and generates output signal 6 having a value indicative of the sensed temperature. The pulses counted by conversion circuitry 512 are utilized to offset the temperature corresponding to the frequency of reference signal 4 so as to provide the temperature sensed by PTAT resistive element 21. In the exemplary embodiment of the present invention, the temperature corresponding to the frequency of reference signal 4 is selected to be a temperature below zero degrees C., such as −64 degrees C., and each pulse appearing on signal 508 corresponds to a temperature increase of one degree C., relative to the predetermined temperature of −64 degrees C.

Conversion circuitry 512 may include a counter 513 which receives signal 508 and selectively counts the pulses appearing thereon. Counter 513 is initially loaded with the temperature value of the temperature corresponding to the frequency of reference signal 4, such as −64 (64), and thereafter increments (decrements) the temperature value by one for each occurrence of a pulse appearing on signal 508. In this way, counter 513 offsets the temperature corresponding to the frequency of reference signal 4 when the sensed temperature is negative and/or less than zero degrees C. Upon counting a predetermined number of pulses on signal 508 corresponding to a sensed temperature of zero degrees C., counter 513 asserts sign signal 514 and discontinues counting. Counter 513 may be reset upon assertion of a reset signal indicating the beginning of a new frequency comparison operation.

Conversion circuitry 512 may further include a counter 515 which is adapted to offset the temperature corresponding to the frequency reference signal 4 when the sensed temperature is positive and/or greater than zero degrees C. Counter 515 receives signal 508 and is enabled upon the assertion of sign signal 514 generated by counter 513. A multiplexer circuit 516 couples to output signal 6 either the state of counter 513 or the state of counter 515, based upon the value of sign signal 514 generated by counter 513. Counter 514 may be reset upon assertion of a reset signal indicating the beginning of a new frequency comparison operation.

Figure 3:
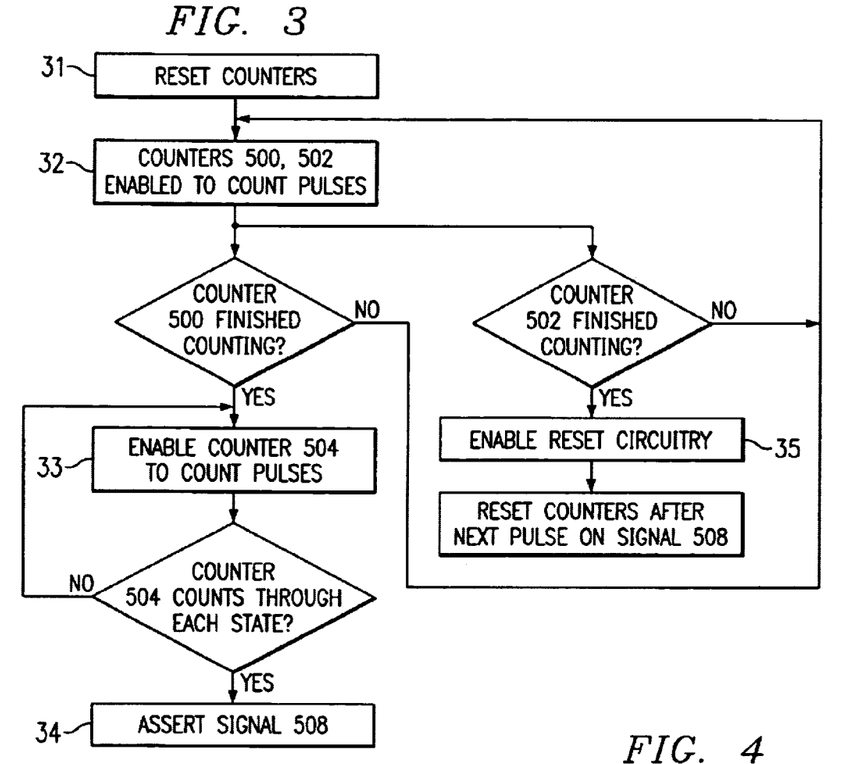
FIGS. 3 and 4 are flow charts illustrating an operation of the temperature sensing device of FIGS. 1 and 2.

The operation of temperature sensing device 1 will be described with reference to FIGS. 3 and 4. Initially, counters 500, 502, 504, 513 and 515 are reset at 31, such as by asserting externally controlled signal RESET. Counters 500, 502 and 504 may each be reset to store the zero value, and counter 513 reset to store temperature value −64. Following the reset operation, at 32 counter 500 counts pulses appearing on reference signal 4 and counter 502 counts pulses appearing on temperature sensitive oscillation signal 23. The frequency of reference signal 4 is chosen in this exemplary embodiment to correspond to the frequency of temperature sensitive oscillator 2 at the lowest temperature that can be sensed thereby, which in this case is −64 degrees C. Therefore, counter 500 will count or cycle through all of its counter states before counter 502 does so. When counter 500 has counted through all of its counter states, signal 501 is asserted which enables counter 504 at 33 to count pulses appearing on reference signal 4. When counter 504 has cycled through all of its counter states, a pulse or triggering edge is generated on signal 508 at 34. Counters 504 and 502 continue counting pulses on reference signal 4 and temperature sensitive oscillation signal 23, respectively.

When counter 502 has counted through all of its counter states, signal 503 is asserted. Storage element 506, which was previously enabled by signal 501 being asserted, asserts its output signal. When signal 508 is next asserted (from counter 504 continuing to count pulses appearing on reference signal 4), the reset circuitry is activated at 34. In particular, the output of logic gate 507 is asserted which causes a pulse to be generated by pulse generator circuit 509. The pulse generated by pulse generator circuit 509 resets counters 500, 502 and 504 to end the frequency comparison operation and begin a new frequency comparison operation.

Figure 4:
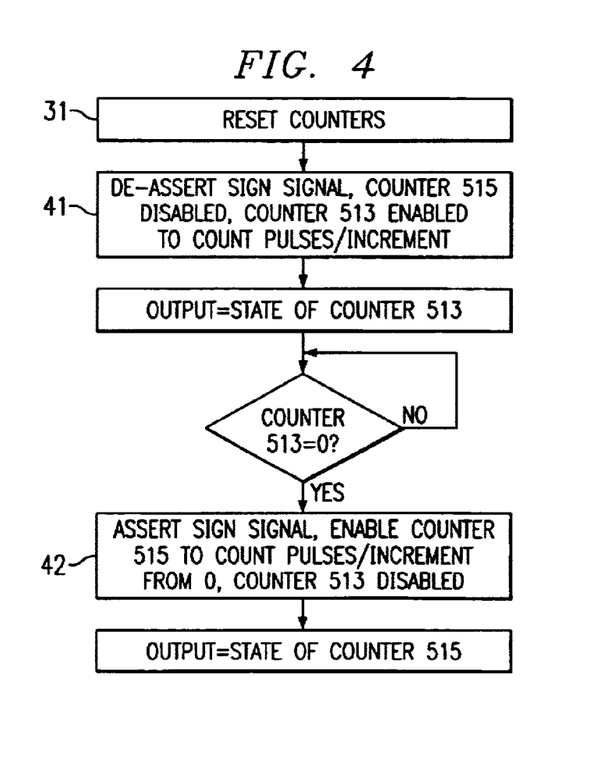

During the frequency comparison operation, at 41 counter 513 is initially enabled to count pulses appearing on signal 508 and counter 515 is initially disabled from counting (FIG. 4). While counter 513 is incrementing and/or counting pulses, output signal 6 is coupled to the state of counter 513. In the event the sensed temperature is less than 0 degrees C., counter 513 will stop counting before reaching counter state zero.

However, in the event counter 513 has counted down from −64 to 0 (indicative of the sensed temperature being at least 0 degrees C.), at 42 sign signal 514 is asserted and counter 515 enabled to count pulses appearing on signal 508. At this point, counter 513 is disabled and output signal 6 is coupled to receive the counter state of counter 515. Counter 515 thereafter counts pulses appearing on signal 508. Counter 515 counts up from the reset state of a logic zero. When counter 502 counts through all of its counter states (initiating the end of the frequency comparison operation), the final counter state of counter 515 is the sensed temperature.

Because process variations may cause the resistance of PTAT resistive element 21 of temperature sensitive oscillator 2 to relatively considerably vary, temperature sensing device 1 includes calibration circuitry 7 (FIG. 1) for use in more accurately controlling the operation of PTAT resistive element 21. Calibration circuitry 7 generally indicates an amount by which PTAT resistive element 21 is to be modified, based upon the difference in frequency between temperature sensitive oscillation signal 23 and reference signal 4.

In accordance with an exemplary embodiment of the present invention, calibration circuitry 7 may include a counter 71 (FIG. 5) which receives temperature sensitive oscillation signal 23 and counts the pulses appearing thereon. A logic gate 72, such as a logic NOR gate, may combine temperature sensitive oscillation signal 23 with a feedback signal at the clock input of counter 71. Counter 71 may be reset to a reset value by asserting a calibration reset signal.

Figure 5:
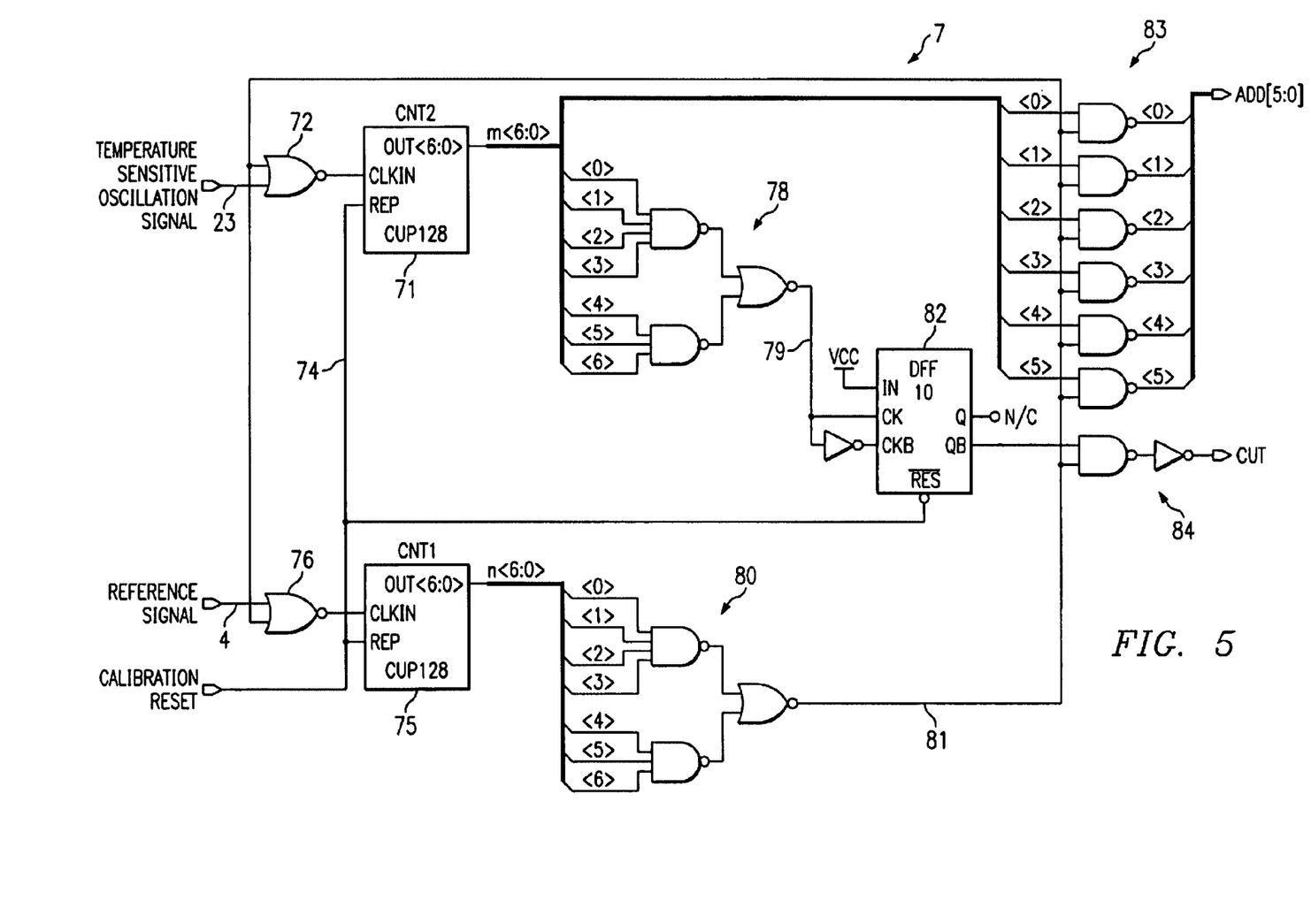
FIG. 5 is a diagram of a self-calibration circuit of the temperature sensing device of FIG. 1.

Calibration circuitry 7 may further include a second counter 75 which receives reference signal 4 and counts the pulses appearing thereon. A logic gate 76, such as a logic NOR gate, may combine with reference signal 4 with the feedback signal at the clock input of counter 75. Counter 75 may be reset to a reset value by asserting a calibration reset signal.

Calibration circuitry 7 may further include decode circuitry 77 which, based upon the state of counters 71 and 75, indicates an amount by which PTAT resistive element 21 is to be modified. In the exemplary embodiment of the present invention shown in FIG. 5, decode circuitry 77 may include first decode circuit 78 which asserts signal 79 when the value of counter 71 reaches its maximum value or otherwise has counted through all of its counter states. Decode circuitry 77 may further include second decode circuit 80 which asserts a signal 81 when the value of counter 75 reaches its maximum value or otherwise has counted through all of its counter states. The output signal 81 of decode circuit 80 forms the above-mentioned feedback signal to disable counters 71 and 75 when asserted. Decode circuits 78 and 80 generate output signals that indicate an amount by which PTAT resistive element 21 is to be modified.

Calibration circuitry 7 further includes a storage element 82 which is normally maintained in a reset state but is set upon the output of decode circuit 78 being asserted. As shown in FIG. 5, storage element 82 is reset by calibration reset signal 74 being asserted. Storage element 82 receives signal 79 at its clock input and a high reference voltage level at its data input. The inverted output of storage element 82 is used to disable an output of calibration circuitry 7, as explained in greater detail below.

In accordance with the exemplary embodiment of the present invention, calibration circuitry 7 generates a plurality of output signals ADD having values by which PTAT resistive element 21 is to be increased. Each output signal ADD [n] is coupled to a distinct storage element of counter 71, such that output signal ADD[0] is coupled to the least significant bit (LSB) of the output of counter 71, ADD[1] is coupled to the next to last LSB of the output of counter 71, etc. Output signal ADD[5] is coupled to the most significant bit (MSB) of counter 71. Each output signal ADD [5:0] is enabled upon the assertion of signal 81 generated by decode circuit 80. Logic gates 83, such as logic AND gates, are used to couple the output of counter 71 to output signals ADD [5:0].

It is understood that the width of counter 71 and signal ADD may vary as desired.

Calibration circuitry 7 may generate an output signal CUT adapted to indicate whether PTAT resistive element 21 should be cut or trimmed by a predetermined amount. Output signal CUT is coupled to signal 81 generated by decode circuit 80 upon the assertion of the inverted output of storage element 82. Logic gate 84, such as a logic AND gate, may be used to couple signal 81 to output signal CUT.

Figure 6:
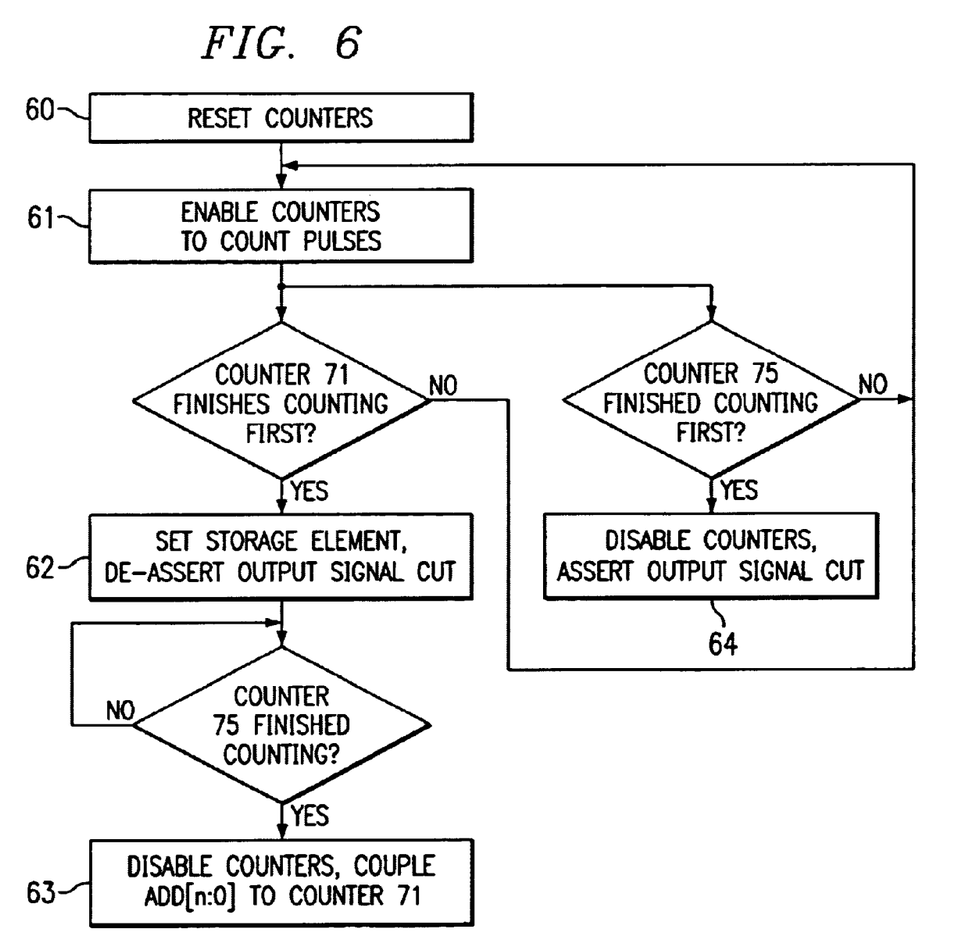
FIG. 6 is a flow chart illustrating an operation of the self-calibration circuit of FIG. 5.

The operation of calibration circuitry 7 will be described with reference to FIG. 6. For purposes of calibrating temperature sensing device 1, the frequency of reference signal 4 may be set to the frequency at which temperature sensitive oscillator 2 is expected to oscillate, given a known temperature to be sensed by temperature sensitive oscillator 2. In this way, during the calibration operation temperature sensitive oscillation signal 23 is expected to have to same frequency as the frequency of reference signal 4. Counters 71 and 75 and storage element 82 are initially reset at 60 upon assertion of calibration reset signal 74. In this reset state, output signals ADD[5:0] and CUT are in the logic low state.

Thereafter, counters 71 and 75 are enabled at 61 to count the pulses appearing on temperature sensitive oscillation signal 23 and reference signal 4, respectively. In the event counter 71 cycles through each of its counter states prior to counter 75 counting through each of the counter states thereof (thereby indicating that temperature sensitive oscillator 2 is operating too fast and requiring the resistance of PTAT resistive element 21 be increased), decode circuit 78 sets storage element 82 at 62 which de-asserts output signal CUT. When counter 75 then cycles through each of its counter states, counters 71 and 75 are disabled from counting at 63 by signal 81 being asserted. At this point, output signal ADD [5:0] is coupled to counter 71 to indicate an amount by which PTAT resistive element 21 is to be increased.

For example, the value of output signal ADD[5:0] may indicate a resistance increase between 0% and 100%. In this case, the assertion of output signal ADD[5] indicates a 50% increase in resistance of PTAT resistive element 21, the assertion of output signal ADD[4] indicates a 25% increase in resistance of PTAT resistive element 21, etc.

In the event counter 75 cycles through each of its counter states prior to counter 71 cycling through each of its counter states (thereby indicating that temperature sensitive oscillator 2 is operating too slow and requiring that the resistance of PTAT resistive element 21 be decreased), decode circuit 80 disables counters 71 and 75 at 64. In addition, with signal 81 and the inverted output of storage element 82 being asserted, output signal CUT is asserted, thereby indicating that a reduction in resistance in PTAT resistive element 21 is necessary. For example, output signal CUT being asserted may indicate that PTAT resistive element 21 needs to be cut and/or trimmed by 50%.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A circuit for determining temperature, comprising:
a first oscillator circuit that generates a first signal having a frequency that is dependent upon a sensed temperature;
difference circuitry for determining a difference in frequency between the first signal and a second signal having a frequency that is substantially independent of temperature, and generating a difference signal having a number of pulses thereon based upon the difference; and
one or more counter circuits, responsive to the difference circuitry, for offsetting a predetermined temperature value based upon the pulses appearing on the difference signal, to obtain an output signal indicative of the sensed temperature, wherein the one or more counter circuits comprises a first counter circuit and a second counter circuit, the first and second counter circuits receiving the difference signal and the second counter circuit being enabled by the first counter circuit.

2. The circuit of claim 1, wherein:
the predetermined temperature is a minimum temperature corresponding to the frequency of the second signal; and
the one or more counter circuits increments the predetermined temperature value in response to the pulses appearing on the difference signal.

3. The circuit of claim 1, wherein:
the second counter circuit is enabled to count the pulses appearing on the difference signal following the first counter circuit counting through each counter state thereof.

4. The circuit of claim 1, further comprising:
a multiplexer circuit for receiving an output of the first counter circuit and an output of the second counter circuit, an output of the multiplexer circuit being the output signal.

5. The circuit of claim 4, wherein:
the multiplexer circuit couples the output of the first counter circuit to the output signal prior to the first counter circuit counting through each counter state thereof.

6. The circuit of claim 4, wherein:
the multiplexer circuit couples the output of the second counter circuit to the output signal following the first counter circuit counting through each counter state thereof.

7. The circuit of claim 1, wherein the difference signal is divided down from the second signal.

8. The circuit of claim 1, wherein the difference signal is divided down from the second signal prior to a first predetermined number of pulses appearing on the first signal and following a second predetermined number of pulses appearing on the second signal.

9. The circuit of claim 1, wherein the first and second counter circuits are capable of providing an output signal having a value indicative of the sensed temperature being of opposite polarity from the predetermined temperature value.

10. A circuit for determining temperature, comprising:
a first oscillator circuit that generates a first signal having a frequency that is dependent upon a sensed temperature;
difference circuitry for determining a difference in frequency between the first signal and the second signal having a frequency that is substantially independent of temperature, and generating a difference signal having a number of pulses thereon based upon the difference; and
one or more counter circuits, responsive to the difference circuitry, for offsetting a predetermined temperature value based upon the pulses appearing on the difference signal, to obtain an output signal indicative of the sensed temperature;

wherein the difference circuitry comprises:
   a first counter for counting a first predetermined number of pulses appearing on the second signal;
   a second counter for counting a second predetermined number of pulses appearing on the first signal; and
   a third counter for counting the number of pulses appearing on the second signal, the third circuit being enabled upon the first counter counting the first predetermined number of pulses appearing on the second signal.

11. The circuit of claim 10, further comprising:
   circuitry for resetting the first and second counters upon each of the first and second counters counting the first and second predetermined number of pulses, respectively.

12. A method of determining a temperature, comprising:
   sensing a temperature;
   generating a first signal having a frequency that is temperature insensitive;
   generating a second signal having a frequency dependent upon the sensed temperature;
   generating a difference signal having a number of pulses appearing thereon based upon a difference in frequency between the first signal and the second signal; and
   offsetting a predetermined temperature value based upon the pulses appearing on the difference signal to obtain a temperature value corresponding to the sensed temperature;
   wherein generating the difference signal comprises:
      counting a first predetermined number of pulses appearing on the first signal;
      counting a second predetermined number of pulses appearing on the second signal;
      counting the number of pulses appearing on the first signal prior to the second predetermined number of pulses appearing on the second signal and following a first predetermined number of pulses appearing on the first signal; and
      generating a pulse on the difference signal upon a predetermined number of pulses counted on the first signal prior to the second predetermined number of pulses appearing on the second signal and following a first predetermined number of pulses appearing on the first signal.

13. The method of claim 12, wherein:
   the predetermined temperature is a minimum temperature value; and
   the step of offsetting comprises incrementing the predetermined temperature value upon each occurrence of a pulse appearing on the difference signal.

14. The method of claim 12, wherein the difference signal is divided down from the first signal.

15. The method of claim 12, wherein the difference signal is divided down from the first signal prior to a second predetermined number of pulses appearing on the second signal and following a first predetermined number of pulses appearing on the first signal.

16. The method of claim 12, wherein the temperature value obtained is of opposite polarity to the predetermined temperature value.

17. A circuit for determining temperature, comprising:
   a ring oscillator circuit;
   a proportional to absolute temperature (PTAT) resistive element coupled to the ring oscillator circuit such that a frequency of the ring oscillator circuit is based upon a resistance of the PTAT resistive element; and
   calibration circuitry for comparing the frequency of the ring oscillator circuit with a known frequency and generating at least one output signal indicative of an amount by which the PTAT resistive element is to be modified.

18. The circuit of claim 17, wherein:
   the calibration circuitry generates at least one output signal, the assertion of which indicates that the resistance of the PTAT resistive element is to be reduced by a predetermined amount.

19. The circuit of claim 17, wherein:
   the calibration circuitry generates a plurality of output signals, the value of the output signals being indicative of an amount by which a resistance of the PTAT resistive element is to be increased.

20. The circuit of claim 17, wherein the calibration circuitry comprises:
   a first counter for counting pulses appearing on an output of the ring oscillator circuit;
   a second counter for counting pulses appearing on a reference signal having the known frequency; and
   decode circuitry, coupled to the first and second counters, for selectively asserting at least one first signal indicating that a resistance of the PTAT resistive element is to be reduced, and for selectively asserting at least one second signal indicating that the resistance of the PTAT resistive element is to be increased, based upon the time period the first counter counts a predetermined number of pulses and the time period the second counter counts a predetermined number of pulses.

21. The circuit of claim 20, wherein:
   the decode circuitry asserts the at least one first signal upon the second counter cycling through each counter state thereof prior to the first counter cycling through each counter stage thereof.

22. The circuit of claim 21, wherein:
   the decode circuitry disables the first and second counters upon the second counter cycling through each counter state thereof, the state of the first counter being coupled to the at least one second signal upon the first counter being disabled.

23. The circuit of claim 20, wherein:
   the decode circuitry de-asserts the at least one first signal upon the first counter cycling through each counter state thereof prior to the second counter cycling through each counter state thereof.

24. The circuit of claim 23, wherein:
   the at least one first signal is maintained in a de-asserted state following the second counter cycling each counter state.

25. A method of determining temperature, comprising:
   sensing, by a PTAT resistive element, a temperature;
   generating a first signal having a frequency dependent upon the sensed temperature;
   receiving a second signal having a known frequency; and
   comparing the frequency of the first signal with the known frequency and generating at least one output signal indicative of an amount by which a resistance of the PTAT resistive element is to be modified.

26. The method of claim 25, wherein the generating generates at least one output signal, the assertion of which indicates that the resistance of the PTAT resistive element is to be reduced by a predetermined amount.

27. The method of claim 25, wherein the generating generates a plurality of output signals, the value of the output signals being indicative of an amount by which the resistance of the PTAT resistive element is to be increased.

28. The method of claim 25, wherein the comparing comprises:

counting pulses appearing on the first signal;

counting pulses appearing on a signal having the known frequency;

comparing the time period over which a predetermined number of pulses are counted on the first signal to the time period over which a predetermined number of pulses are counted on the signal having the known frequency; and based upon the comparison, selectively asserting at least one first signal indicating that the resistance of the PTAT resistive element is to be reduced, and selectively asserting at least one second signal indicating that the resistance of the PTAT resistive element is to be increased.

29. An apparatus for determining temperature, comprising:

a first oscillator circuit that generates a first signal having a frequency that is dependent upon a sensed temperature;

difference circuitry for determining a difference in frequency between the first signal and a second signal having a frequency that is substantially independent of temperature, and generating a difference signal having a number of pulses thereon based upon the difference, the number of pulses corresponding to the number of pulses of a first one of the first and second signals occurring after a first predetermined number of pulses appear on the first one of the first and second signals, and occurring before a second predetermined number of pulses appear on a second one of the first and second signals; and one or more counter circuits, responsive to the difference circuitry, for offsetting a predetermined temperature value based upon the pulses appearing on the difference signal, to obtain an output signal indicative of the sensed temperature.

30. The apparatus of claim 29, wherein the difference circuitry comprises:

a first counter for counting a first predetermined number of pulses appearing on the second signal;

a second counter for counting a second predetermined number of pulses appearing on the first signal; and a third counter for counting the number of pulses appearing on the second signal, the third circuit being enabled upon the first counter counting the first predetermined number of pulses appearing on the second signal.

31. The apparatus of claim 30, further comprising circuitry for disabling the first and second counters from counting upon the first and second counters counting the first and second predetermined number of pulses, respectively.

32. The apparatus of claim 29, wherein:

the one or more counter circuits comprises a first counter circuit and a second counter circuit, the first and second counter circuits receiving the difference signal and the second counter circuit being enabled by the first counter circuit.

33. The apparatus of claim 32, wherein:

the second counter circuit is enabled to count the pulses appearing on the difference signal following the first counter circuit counting through each counter state thereof.

34. The apparatus of claim 32, further comprising:

a multiplexer circuit for receiving an output of the first counter circuit and an output of the second counter circuit, an output of the multiplexer circuit being the output signal.

35. The apparatus of claim 34, wherein:

the multiplexer circuit couples the output of the first counter circuit to the output signal prior to the first counter circuit counting through each counter state thereof.

36. The apparatus of claim 34, wherein:

the multiplexer circuit couples the output of the second counter circuit to the output signal following the first counter circuit counting through each counter state thereof.

37. The apparatus of claim 29, wherein:

apparatus measures both positive and negative temperatures.

38. The apparatus of claim 29, wherein the one or more counter circuits are capable of providing an output signal having a value indicative of the sensed temperature being of opposite polarity from the predeterminedf temperature value.

* * * * *

UNITED STATES PATENT AND TRADEMARK OFFICE
CERTIFICATE OF CORRECTION

PATENT NO. : 6,695,475 B2
DATED : February 24, 2004
INVENTOR(S) : Rong Yin It is certified that error appears in the above-identified patent and that said Letters Patent is hereby corrected as shown below:

Column 12,
Line 44, delete the "f" at the end of the word "predetermined".

Signed and Sealed this

First Day of November, 2005

JON W. DUDAS
*Director of the United States Patent and Trademark Office*